US012684363B2

(12) United States Patent
Harada et al.

(10) Patent No.: US 12,684,363 B2
(45) Date of Patent: Jul. 14, 2026

(54) RADIO BASE STATION AND TERMINAL

(71) Applicant: NTT DOCOMO, INC., Tokyo (JP)

(72) Inventors: Hiroki Harada, Tokyo (JP); Shinya Kumagai, Tokyo (JP); Naoya Shibaike, Tokyo (JP); Mayuko Okano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 368 days.

(21) Appl. No.: 18/031,763

(22) PCT Filed: Oct. 15, 2020

(86) PCT No.: PCT/JP2020/039002
§ 371 (c)(1),
(2) Date: Apr. 13, 2023

(87) PCT Pub. No.: WO2022/079879
PCT Pub. Date: Apr. 21, 2022

(65) Prior Publication Data
US 2023/0388806 A1     Nov. 30, 2023

(51) Int. Cl.
| | |
|---|---|
| *H04W 16/14* | (2009.01) |
| *H04W 16/28* | (2009.01) |
| *H04W 56/00* | (2009.01) |
| *H04W 74/0816* | (2024.01) |

(52) U.S. Cl.
CPC ........... *H04W 16/14* (2013.01); *H04W 16/28* (2013.01); *H04W 56/001* (2013.01); *H04W 74/0816* (2013.01)

(58) Field of Classification Search
CPC ..... H04W 16/14; H04W 16/28; H04W 56/00; H04W 56/001; H04W 74/0808; H04W 74/0816

USPC ....... 370/329, 252, 318, 331, 315, 316, 336, 370/311
See application file for complete search history.

(56) References Cited

U.S. PATENT DOCUMENTS

| | | | | |
|---|---|---|---|---|
| 10,813,085 | B2 * | 10/2020 | Deenoo | H04W 72/046 |
| 11,342,961 | B1 * | 5/2022 | Vis | H04B 17/29 |
| 2019/0342805 | A1 * | 11/2019 | Hao | H04W 72/0453 |
| 2020/0145079 | A1 * | 5/2020 | Marinier | H04W 72/23 |
| 2020/0245269 | A1 * | 7/2020 | Tomeba | H04L 27/0006 |
| 2020/0296635 | A1 * | 9/2020 | Rastegardoost | H04W 36/0064 |
| 2021/0331312 | A1 * | 10/2021 | Kim | G05D 1/0246 |
| 2022/0078745 | A1 * | 3/2022 | Siomina | H04B 7/0645 |
| 2022/0086709 | A1 * | 3/2022 | Hao | H04W 16/28 |
| 2023/0085595 | A1 * | 3/2023 | Hirzallah | H04B 17/101 |
| | | | | 370/329 |

(Continued)

OTHER PUBLICATIONS

ETSI TS 137 213 V16.5.0 (Apr. 2021) LTE; 5G; Physical layer procedures for shared spectrum channel access (3GPP TS 37.213 version 16.5.0 Release 16).*

(Continued)

*Primary Examiner* — Joseph Arevalo
(74) *Attorney, Agent, or Firm* — Osha Bergman Watanabe & Burton LLP

(57) ABSTRACT

A channel access procedure is executed in a second frequency band different from the first frequency band. A radio base station executes a channel access procedure using a single directional reception beam, and transmits a single synchronization signal block in a channel occupancy time after the channel access procedure.

3 Claims, 7 Drawing Sheets

(56) References Cited

U.S. PATENT DOCUMENTS

| | | | | |
|---|---|---|---|---|
| 2023/0247648 A1* | 8/2023 | Oh | ........................... | H04L 5/00 |
| | | | | 370/252 |
| 2023/0254893 A1* | 8/2023 | Shibaike | ........... | H04W 74/0808 |
| | | | | 370/329 |
| 2023/0309144 A1* | 9/2023 | Zhu | ................... | H04W 56/0015 |
| 2023/0413068 A1* | 12/2023 | Murakami | ............ | H04W 16/28 |

OTHER PUBLICATIONS

Office Action issued in Japanese Patent Application No. 2022-556793, dated Sep. 10, 2024 (7 pages).
Office Action issued in Chinese Patent Application No. 202080106133.0, dated Sep. 5, 2024 (12 pages).
Notice of Reasons for Refusal issued in Japanese Application No. 2022-556793, mailed Feb. 25, 2025 (7 pages).
Samsung: "Channel access procedures for NR-U"; 3GPP TSG-RAN WG1 Meeting #95, R1-1812977; Spokane, USA, Nov. 12-16, 2018 (9 pages).
Qualcomm Incorporated: "Channel access mechanism for NR in 52.6 to 71GHz band"; 3GPP TSG RAN WG1 Meeting #102-e, R1-2006798; e-Meeting, Aug. 17-28, 2020 (13 pages).
Minoru Inomata Tetsuro Imai, 5G Innovation Promotion Office; "5G area optimization. The real-time electric wave visualizer cor-responding to electric wave visualization technical"; 5G! Radio Visualization Technology for Rear Optimization 13 GPP Real-Time Radio Visualizer; NTT DOCOMO Technical Journal, vol. 27, No. 1, pp. 56-64, Apr. 2019 (19 pages).
International Search Report issued in PCT/JP2020/039002 on May 11, 2021 (1 page).
Written Opinion of the International Searching Authority issued in PCT/JP2020/039002 on May 11, 2021 (3 pages).
OPPO; "Channel access procedures for NR-U"; 3GPP TSG RAN WG1 #96, R1-1901922; Athens, Greece; Feb. 25-Mar. 1, 2019 (7 pages).
ZTE, Sanechips; "Discussion on initial access signals and channels for NR-U"; 3GPP TSG RAN WG1 Ad-Hoc Meeting 1901, R1-1900097; Taipei; Jan. 21-25, 2019 (6 pages).
Convida Wireless; "Deisgn considerations on channel accessing"; 3GPP TSG-RAN WG1 Meeting #94 Bis, R1-1811625; Chengdu, China; Aug. 8-12, 2018 (6 pages).
Qualcomm; "New WID on Extending current NR operation to 71 GHz"; 3GPP TSG RAN Meeting #86, RP-193229; Sitges, Spain; Dec. 9-12, 2019 (5 pages).
"RAN1 Chairman's Notes", 3GPP TSG RAN WG1 Meeting #102-e, e-Meeting, Aug. 17-28, 2020 (204 pages).
Office Action issued in Chinese Patent Application No. 202080106133.0, issued Apr. 27, 2025 (12 pages).

* cited by examiner

RADIO BASE STATION AND TERMINAL

TECHNICAL FIELD

The present disclosure relates to a radio base station and a terminal that performs radio communication, and more particularly to a radio base station and a terminal that uses unlicensed frequency bands.

BACKGROUND ART

3rd Generation Partnership Project (3GPP) specifies generation mobile communication system (5G, also called New Radio (NR) or Next Generation (NG), further, a succeeding system called Beyond 5G, 5G Evolution or 6G is being specified.

Release 15 and Release 16 (NR) of the 3GPP specify operation in a band that includes multiple frequency ranges, specifically, FR 1 (410 MHz to 7.125 GHz) and FR 2 (24.25 GHz to 52.6 GHz).

Release-17 of the 3GPP is also considering NR beyond 52.6 GHz to 71 GHz (Non-Patent Literature 1). Among these, channel access procedures that comply with regulations applicable to the unlicensed spectrum (also referred to as the unlicensed frequency band) in the 52.6 GHz to 71 GHz frequency band (e.g., implementation of Listen-Before-Talk (LBT)) are being considered.

In the case of the unlicensed frequency band in a high frequency band such as 52.6 GHz to 71 GHz, since the requirement of the interference suppression function based on the regulation is less severe than that of the unlicensed frequency band of FR1, it is agreed to support both the channel access procedure performing LBT and the channel access procedure not performing LBT (Non-Patent Literature 2).

CITATION LIST

Non-Patent Literature

Non-Patent Literature 1 "New WID on Extending current NR operation to 71 GHz", RP-193229, 3GPP TSG RAN Meeting #86, 3GPP, December 2019
Non-Patent Literature 2 "RAN1 Chairman's Notes", 3GPP TSG RAN WG1 Meeting #102-e, e-Meeting, 3GPP, August 2020

SUMMARY OF INVENTION

In the frequency band between 52.6 GHz and 71 GHz, it is considered to use up to 64 synchronization signal blocks (SSB: SS/PBCH Blocks) as in the case of the FR 2. In particular, in the case of a high frequency band such as 52.6 GHz to 71 GHz, it is assumed that, in order to ensure a certain coverage, it is necessary to sequentially sweep beams with different directions and sequentially transmit SSBs (which may be referred to as discovery bursts) associated with the beams.

If the unlicensed frequency band is present in the high frequency band (For example, in the 60 GHz band), Directional LBT/CCA (also referred to as Beam-based LBT/CCA (Clear Channel Assessment)) using multiple beams may be one solution.

However, since a particular Directional LBT/CCA can cover only a particular direction, the signal that can be transmitted within the corresponding channel occupancy time (COT) is also limited to that particular direction.

Therefore, in the case of transmitting an SSB using the Directional LBT/CCA, a single Directional LBT/CCA cannot support transmission of a plurality of SSBs having different directions within a COT, and there is a problem in terms of transmission efficiency.

Accordingly, the following disclosure has been made in view of such a situation, and it is an object of the present invention to provide a radio base station and a terminal capable of efficiently transmitting a synchronization signal block (discovery burst) even when using an unlicensed frequency band of a high frequency band such as a 60 GHz band.

One aspect of the present disclosure is a radio base station (gNB 100) including a control unit (control unit 270) that executes a channel access procedure in a second frequency band different from a first frequency band. The control unit performs the channel access procedure using a single directivity that is wider than in other cases, and transmits a plurality of different synchronization signal blocks in a channel occupancy time after the channel access procedure.

One aspect of the present disclosure is a radio base station (gNB 100) including a control unit (control unit 270) that executes a channel access procedure in a second frequency band different from a first frequency band. The control unit performs the channel access procedure using a plurality of directional receive beams, and transmits a single or a plurality of different synchronization signal blocks in a channel occupancy time after the channel access procedure.

One aspect of the present disclosure is a radio base station (gNB 100) including a control unit (control unit 270) that executes a channel access procedure in a second frequency band different from a first frequency band. The control unit executes the channel access procedure using a single directional receive beam, and transmits a single synchronization signal block in a channel occupancy time after the channel access procedure.

BRIEF DESCRIPTION OF DRAWINGS

FIG. 4 is a functional block diagram of the gNB 100 and the UE 200.

MODES FOR CARRYING OUT THE INVENTION

Figure 1:
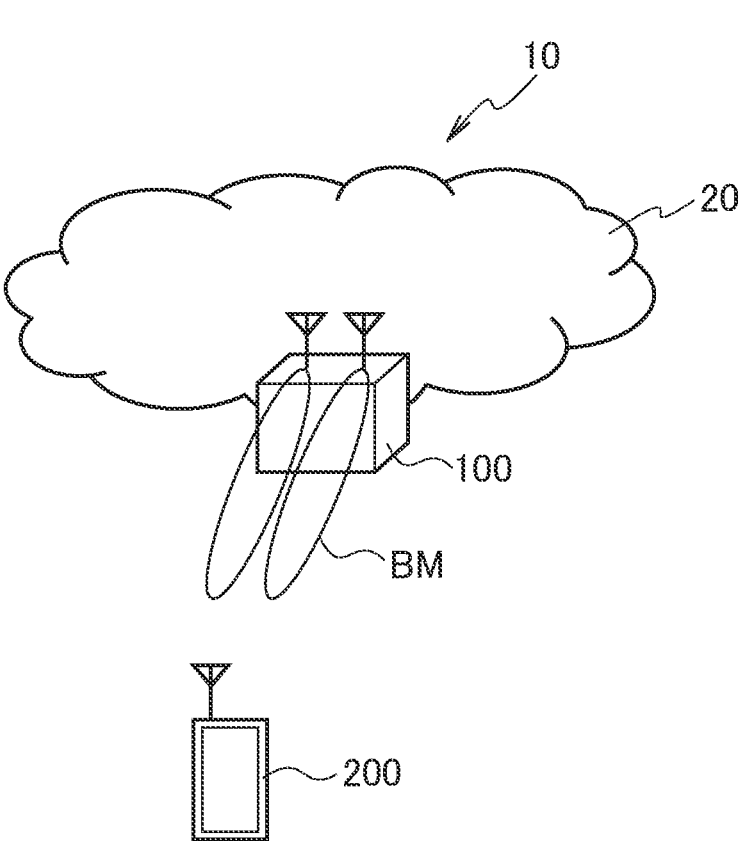
FIG. 1 is an overall schematic configuration diagram of radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration diagram of a radio communication system 10 according to this embodiment. The radio communication system 10 is a 5G New Radio (NR) compliant radio communication system and includes a Next Generation-Radio Access Network 20 (NG-RAN 20), and terminal 200 (UE 200, User Equipment, UE). The radio communication system 10 may be a radio communication system that follows a scheme called Beyond 5G, 5G Evolution or 6G.

The NG-RAN 20 includes a radio base station 100 (hereinafter, gNB 100). The specific configuration of radio communication system 10 including the number of gNBs and UEs is not limited to the example shown in FIG. 1.

The NG-RAN 20 actually includes a plurality of NG-RAN Nodes, specifically gNBs (or ng-eNBs), and is connected to a core network (5GC, not shown) according to 5G. The NG-RAN 20 and 5GC may be expressed simply as a "network".

The gNB 100 is a radio base station according to 5G, and executes radio communication according to the UE 200 and 5G. By controlling radio signals transmitted from a plurality of antenna elements, the gNB 100 and the UE 200 can support Massive MIMO (Multiple-Input Multiple-Output) for generating antenna beams (hereinafter beam BM) with higher directivity, carrier aggregation (CA) for bundling a plurality of component carriers (CC), and dual connectivity (DC) for simultaneously communicating between the UE and each of the two NG-RAN nodes.

The gNB 100 can transmit a plurality of beams BM having different transmission directions (May simply be referred to as direction, or radial direction or coverage, etc.) by dividing them into space and time. Note that the gNB 100 may simultaneously transmit a plurality of beams BM.

Figure 2:
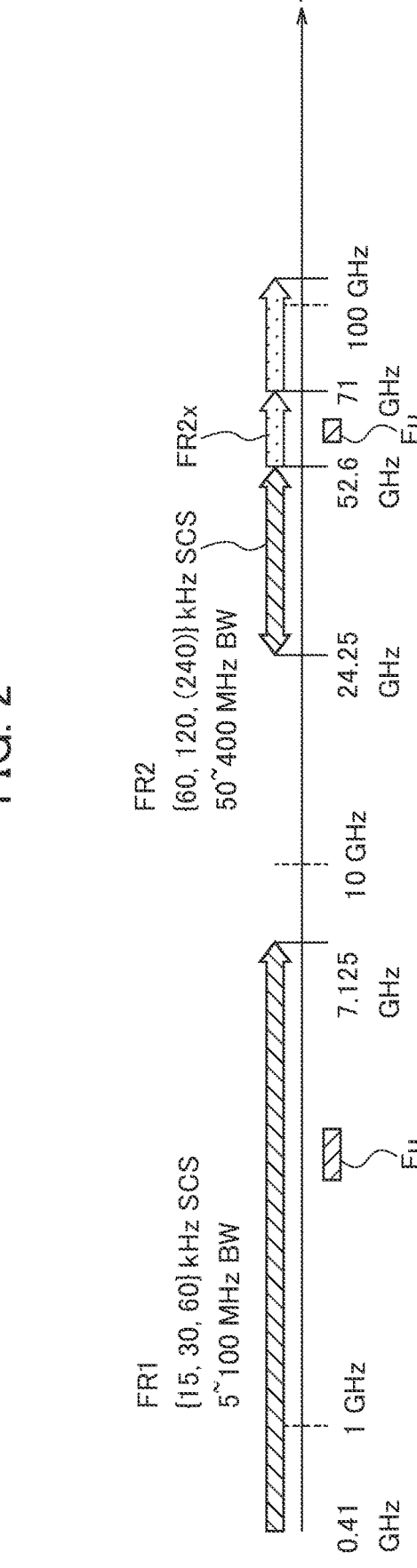
FIG. 2 is a diagram illustrating a frequency range used in radio communication system 10.

The radio communication system 10 may correspond to a plurality of frequency ranges (FR). FIG. 2 shows the frequency range used in radio communication system 10.

FR 1: 410 MHz to 7.125 GHz

FR 2: 24.25 GHz to 52.6 GHz

In FR 1, 15, 30 or 60 kHz Sub-Carrier Spacing (SCS) may be used and a 5~100 MHz bandwidth (BW) may be used. FR 2 is a higher frequency than FR 1, and an SCS of 60 or 120 kHz (240 kHz may be included) may be used, and a bandwidth (BW) of 50~400 MHz may be used.

The SCS may be interpreted as numerology. Numerology is defined in 3GPP TS 38.300 and corresponds to one subcarrier interval in the frequency domain.

In addition, radio communication system 10 also corresponds to a higher frequency band than the frequency band of the FR 2. Specifically, radio communication system 10 supports the frequency band from 52.6 GHz up to 71 GHz. Such a high frequency band may be referred to as "FR2x" for convenience.

To solve this problem, when using a band above 52.6 GHz, cyclic prefix-orthogonal frequency division multiplexing (CP-OFDM)/discrete Fourier transform-spread (DFT-S-OFDM) with larger sub-carrier spacing (SCS) may be applied.

Figure 3:
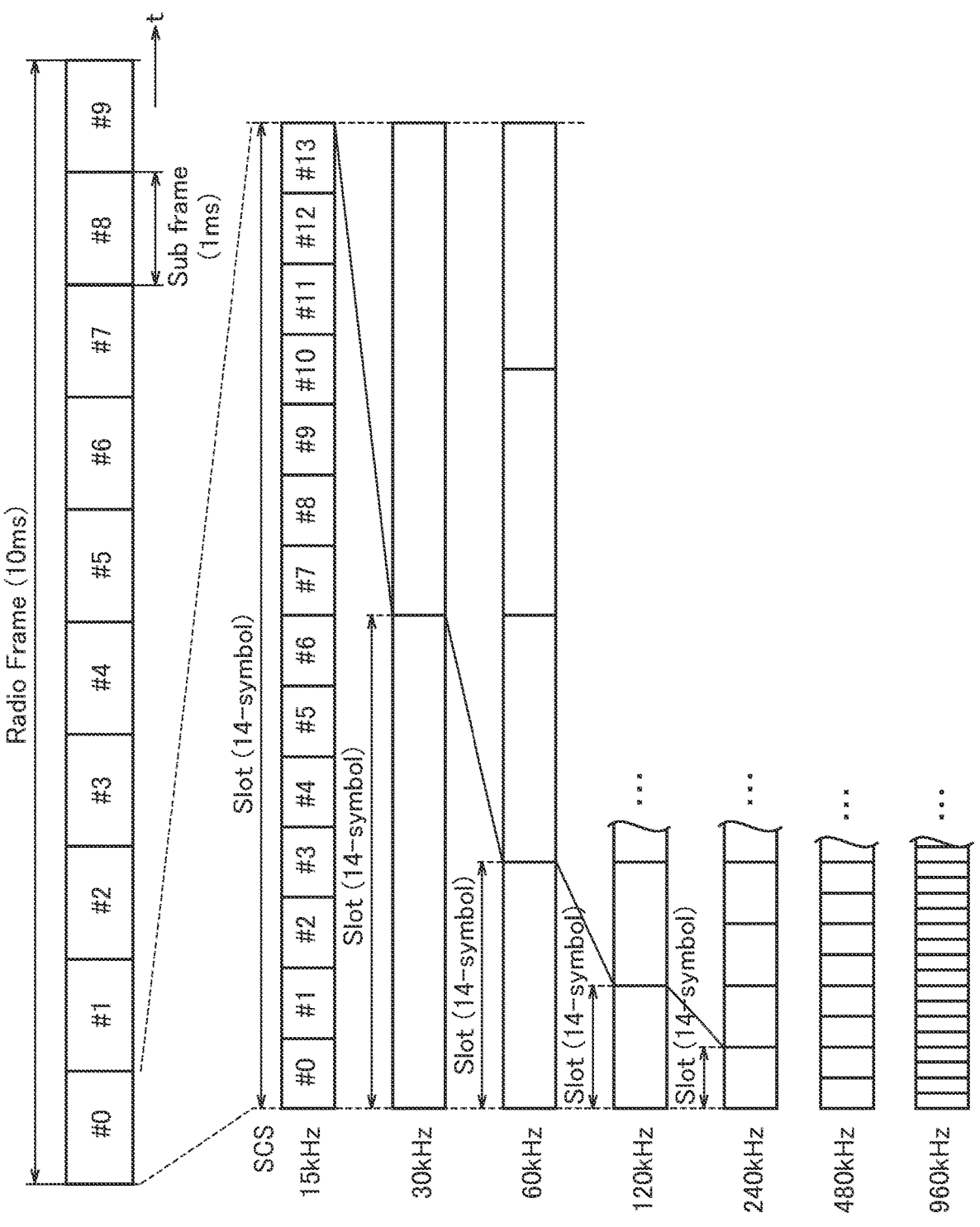
FIG. 3 is a diagram showing a configuration example of a radio frame, a sub-frame and a slot used in radio communication system 10.

FIG. 3 shows a configuration example of a radio frame, a sub-frame and a slot used in radio communication system 10.

As shown in FIG. 3, one slot comprises 14 symbols, and the larger (wider) the SCS, the shorter the symbol period (and the slot period). The SCS may be 480 kHz, 960 kHz, or the like.

The number of symbols constituting 1 slot is not necessarily 14 (For example, 28, 56 symbols). Furthermore, the number of slots per subframe may vary depending on the SCS.

The time direction (t) shown in FIG. 3 may be referred to as a time domain, a symbol period or a symbol time. The frequency direction may be referred to as a frequency domain, a resource block, a subcarrier, a bandwidth part (BWP), or the like.

Further, in radio communication system 10, in addition to the frequency bands individually allocated to the respective communication carriers for the radio communication system 10, an unlicensed frequency band Fu different from the aforementioned frequency band is used. Concretely, in the radio communication system 10, New Radio-Unlicensed (NR-U) is practicable which expands available frequency bands by using a spectrum of unlicensed frequency bands. NR-U may be interpreted to include Licensed-Assisted Access (LAA) as a type of usage.

The frequency band allocated for the radio communication system 10 is included in the frequency range of the FR 1 and FR 2 described above and is based on the license allocation by the administration.

The unlicensed frequency band Fu is a frequency band that does not need to be assigned a license by the administration and can be used without being limited to a specific carrier (operator). For example, a frequency band (2.4 GHz, 5 GHz, 60 GHz, etc.) for a wireless LAN (WLAN) can be mentioned.

In the unlicensed frequency band Fu, it is possible to install a radio station not limited to a specific carrier, but it is not desirable that signals from neighboring radio stations interfere with each other to greatly deteriorate communication performance.

Therefore, for example, in Japan, as a requirement for a radio system using the unlicensed frequency band Fu (For example, in the 5 GHz band), the mechanism of Listen-Before-Talk (LBT), which allows transmission within a predetermined time period, is applied only when the gNB 100 performs carrier sensing before starting transmission and it is confirmed that the channel is not being used by other systems in the vicinity. Carrier sense is a technique for confirming whether a frequency carrier is used for other communications before transmitting a radio wave.

The LBT may include a Directional LBT/CCA (Clear Channel Assessment) that uses directionality to check whether a channel is being used by another system in a specific direction.

The LBT sub-band in the NR-U may be provided in the unlicensed frequency band Fu, and may be expressed as a band for checking whether the band is used or not in the unlicensed frequency band Fu. The LBT sub-band may be, for example, 20 MHz, half 10 MHz, ¼ 5 MHz, etc. Alternatively, it may be a predetermined band configured by the radio base station (gNB) (for example, a minimum channel bandwidth in a band to be used or a bandwidth of an integer multiple thereof).

The synchronization signal block (SSB) is also used for the initial access in the NR-U as in the 3GPP Release-15.

The SSB is composed of a synchronization signal (SS) and a physical broadcast channel (PBCH).

The SS is composed of a primary synchronization signal (PSS) and a secondary synchronization signal (SSS).

The PSS is a known signal that the UE 200 first attempts to detect in the cell search procedure. The SSS is a known signal transmitted to detect the physical cell ID in the cell search procedure.

The PBCH includes information necessary for the UE 200 to establish frame synchronization with an NR cell formed by the gNB 100 after detecting the SS/PBCH block, such as a system frame number (SFN) and an index for identifying symbol positions of a plurality of SS/PBCH blocks in a half frame (5 milliseconds).

The PBCH may also include system parameters required to receive system information (SIB). The SSB also includes a reference signal for broadcast channel demodulation (DMRS for PBCH). DMRS for PBCH is a known signal sent to measure the radio channel state for PBCH demodulation.

The terminal assumes that each SSB is associated with a different beam BM. That is, the terminal assumes (pseudo collocation assumption) that each SSB is associated with a beam BM having a different transmission direction (coverage). Thus, the UE 200 located in the NR cell can receive any beam BM, acquire the SSB, and start initial access and SSB detection/measurement.

Quasi Co-Location (QCL) is, for example, when the characteristics of the channel through which the symbol on one antenna port is carried can be inferred from the channel through which the symbol on the other antenna port is carried, the two antenna ports are assumed to be quasi-collocated in the same location. The QCL may be referred to as semi-collocation.

The transmission pattern of the SSB may vary depending on the SCS, frequency range (FR), or other parameters.

(2) Function Block Configuration of Radio Communication System

Figure 4:
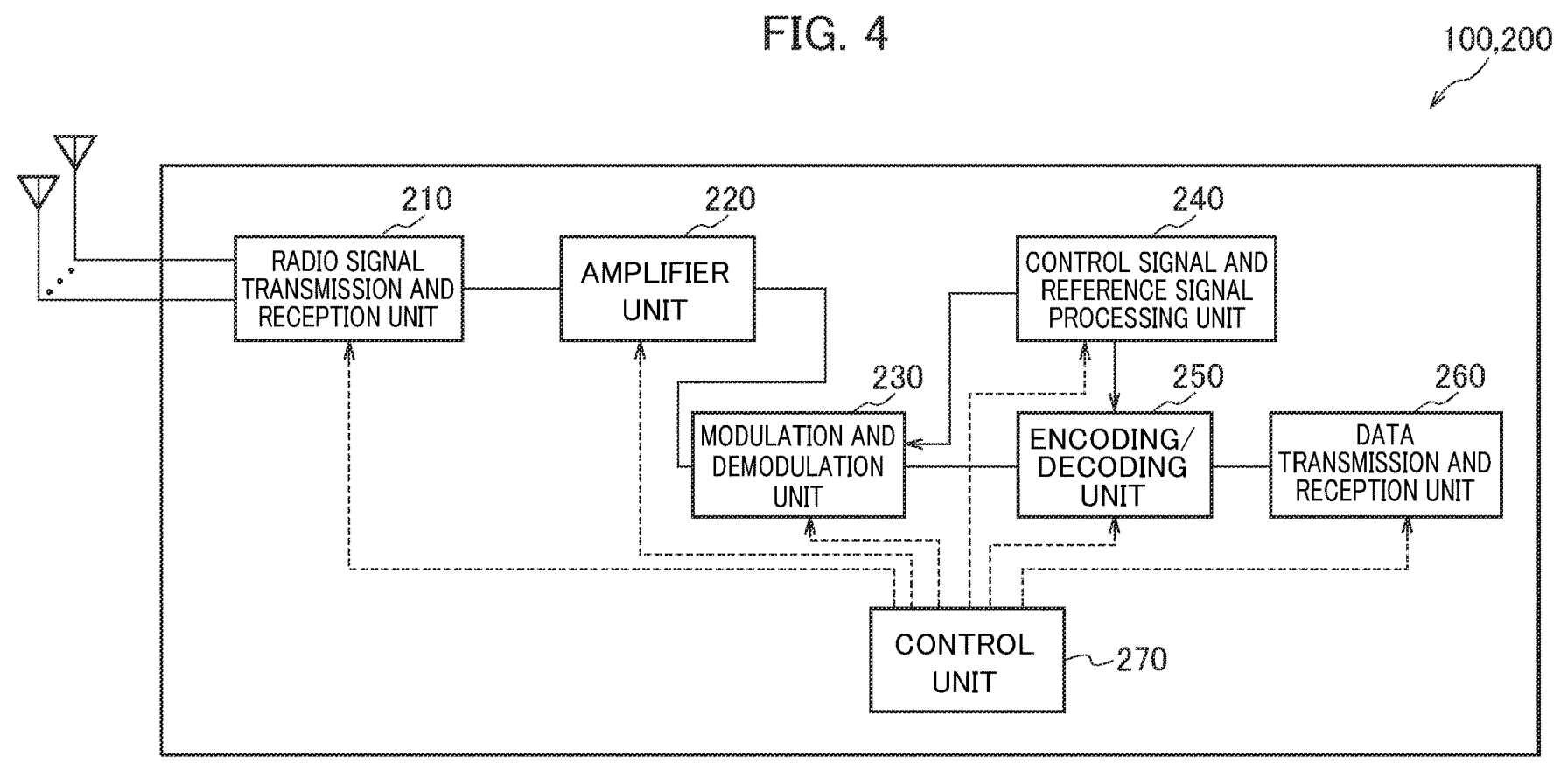

Next, the functional block configuration of radio communication system 10 will be described. Specifically, the functional block configurations of the gNB 100 and the UE 200 will be described. FIG. 4 is a functional block diagram of the gNB 100 and the UE 200.

(2.1) gNB 100

As shown in FIG. 4, gNB 100 includes a radio signal transmission and reception unit 210, an amplifier unit 220, a modulation and demodulation unit 230, a control signal and reference signal processing unit 240, an encoding/decoding unit 250, a data transmission and reception unit 260 and a control unit 270.

The radio signal transmission and reception unit 210 transmits and receives radio signals in accordance with NR. The radio signal transmission and reception unit 210 supports Massive MIMO, CA with multiple CCs bundled together, and DC with simultaneous communication between the UE and each of the 2 NG-RAN Nodes.

The amplifier unit 220 is composed of a PA (Power Amplifier)/LNA (Low Noise Amplifier) and the like. The amplifier unit 220 amplifies the signal output from the modulation and demodulation unit 230 to a predetermined power level. The amplifier unit 220 also amplifies the RF signal output from the radio signal transmission and reception unit 210.

The modulation and demodulation unit 230 performs data modulation/demodulation, transmission power setting, resource block allocation and the like for each predetermined communication destination (UE 200). In the modulation and demodulation unit 230, Cyclic Prefix-Orthogonal Frequency Division Multiplexing (CP-OFDM)/Discrete Fourier Transform-Spread (DFT-S-OFDM) may be applied. The DFT-S-OFDM may be used not only in the uplink (UL) but also in the downlink (DL).

The control signal and reference signal processing unit 240 executes processing relating to various control signals transmitted and received by the gNB 100 and processing relating to various reference signals transmitted and received by the gNB 100.

Specifically, the control signal and reference signal processing unit 240 can transmit various control signals, for example, a control signal of the radio resource control layer (RRC), to the UE 200 via a predetermined control channel. The control signal and reference signal processing unit 240 can receive various control signals from the UE 200 via a predetermined control channel.

The control signal and reference signal processing unit 240 performs processing using reference signals (RS) such as the Demodulation Reference Signal (DMRS) and the Phase Tracking Reference Signal (PTRS).

The DMRS is a reference signal (pilot signal) known between a base station and a terminal of each terminal for estimating a fading channel used for data demodulation. The PTRS is a reference signal for each terminal for the purpose of estimating phase noise which becomes a problem in a high frequency band.

In addition to the DMRS and PTRS, the reference signal may include a Channel State Information-Reference Signal (CSI-RS), a Sounding Reference Signal (SRS), and a Positioning Reference Signal (PRS) for position information.

The channel includes a control channel and a data channel. The control channels include PDCCH (Physical Downlink Control Channel), PUCCH (Physical Uplink Control Channel), RACH (Downlink Control Information (DCI) with Random Access Channel, Random Access Radio Network Temporary Identifier (RA-RNTI)), and Physical Broadcast Channel (PBCH).

The data channels include PDSCH (Physical Downlink Shared Channel) and PUSCH (Physical Uplink Shared Channel). Data means data transmitted over a data channel. The data channel may be read as a shared channel.

Furthermore, for NR-U, a channel may mean a carrier or a portion of a carrier consisting of a set of contiguous resource blocks (RBs) on which channel access procedures are performed in a shared spectrum.

Channel access procedures are specified in 3GPP TS 37.213. The channel access procedure may be interpreted as a sensing-based procedure that evaluates the availability of a channel to carry out a transmission. The basic unit for sensing may also be defined as a sensing slot having a predetermined time.

During the sensing slot period, if the gNB 100 or UE 200 senses a channel and the sensed power is at least below the energy detection threshold, it is considered idle; otherwise, the sensing slot period may be considered busy.

Channel occupancy may also mean transmission over the channel by the gNB (which may be eNB)/UE after the corresponding channel access procedure has been performed.

The "channel occupancy time (COT)" may mean the total time for the gNB/UE sharing channel occupancy and any gNB/UE to perform transmission on the channel after the gNB/UE has executed the corresponding channel access procedure. The channel occupancy time may be shared for transmission between the gNB and the corresponding UE.

Downlink (DL) transmission bursts may be defined as a set of transmissions from a gNB. A DL transmission burst having a gap greater than a predetermined transmission gap may be considered a separate DL transmission burst.

An uplink (UL) transmit burst may be defined as a set of transmissions from a UE. A UL transmit burst having a gap greater than a predetermined transmit gap may be considered a separate UL transmit burst.

A discovery burst may be defined as a DL transmission burst containing a set of signals or channels contained within a predetermined window and associated with a duty cycle. One of the following transmissions initiated by the gNB may be designated as the discovery burst.

Primary Sync Signal (PSS)

Secondary Sync Signal (SSS)

Downlink Physical Broadcast Channel (PBCH)

CORESET (control resource sets) for PDCCH to schedule PDSCH

PDSCH carrying SIB1 and/or non-zero power CSI-RS

Thus, the discovery burst includes SS and PBCH and may be interpreted similarly to SSB. That is, the synchronization signal block (SSB) may be read as a discovery burst.

The encoding/decoding unit 250 performs data division/concatenation, channel coding/decoding, and the like for each predetermined communication destination (UE 200).

Specifically, the encoding/decoding unit 250 divides the data output from the data transmission and reception unit 260 into predetermined sizes, and executes channel coding on the divided data. The encoding/decoding unit 250 decodes the data output from the modulation and the demodulation unit 230 and connects the decoded data.

The data transmission and reception unit 260 transmits and receives protocol data units (PDU) and service data units (SDU). Specifically, data transmission and reception unit 260 performs assembly/disassembly of PDUs/SDUs in a plurality of layers (Media access control layer (MAC), radio link control layer (RLC), and packet data convergence protocol layer (PDCP), etc.). The data transmission and reception unit 260 executes error correction and retransmission control of the data based on the hybrid automatic repeat request (ARQ).

The control unit 270 controls each functional block constituting the gNB 100. In particular, in the present embodiment, the control unit 270 executes control regarding the NR-U.

Specifically, the control unit 270 may perform channel access procedures to access the defined channels in the NR-U described above.

As described above, the channel access procedure is defined in 3GPP TS 37.213. The control unit 270 can execute the channel access procedure in a frequency band (second frequency band) different from the frequency band (first frequency band) allocated by each carrier for radio communication system 10. Specifically, the control unit 270 can execute the channel access procedure in the unlicensed frequency band Fu.

In the following, FR1 and FR2 are treated as a first frequency band, that is, a frequency band allocated for mobile communication for convenience. As shown in FIG. 2, the unlicensed frequency band Fu may actually be included in the FR1 or the like, but in a broad sense, it may be interpreted as a frequency band allocated for mobile communication at a frequency of 52.6 GHz or less.

The channel access procedure performed by the gNB 100 may be referred to as a downlink (DL) channel access procedure. Note that the DL channel access procedure may include the DL channel access procedure of Type 1, 2A, 2B, 2C specified in Chapter 4.1 of 3GPP TS 37.213.

Type 1 may be interpreted as a channel access procedure (LBT) in which a backoff time (which may be referred to as random backoff) is configured in order to avoid a communication collision in the frequency band.

Type 2A/2B may be interpreted as a channel access procedure (LBT) in which random backoff is not configured. The gap between Type 2A and other transmissions may be longer than Type 2B. Type 2C may be interpreted as a channel access procedure in which LBT is not performed. The gap with other transmissions in Type 2C may be shorter than in Type 2A/2B. Type 2A/2B/2C may be interpreted as a channel access procedure performed during a period spanned by slots that are detected to be idle before DL transmission is deterministic.

The control unit 270 can perform channel access procedures for the transmission of synchronization signal blocks in the unlicensed frequency band Fu included in FR 2 x, such as 60 GHz, using a single directivity that is wider than in other cases. The other case may be interpreted, for example, as a channel access procedure for transmission other than the synchronization signal block (SSB) in the unlicensed frequency band Fu included in FR2x.

Specifically, the control unit 270 can perform LBT (which may be referred to as CCA) in the unlicensed frequency band Fu.

As described above, the gNB 100 can transmit and receive a plurality of beams BM having different radiation directions and widths by beamforming, that is, different directivity patterns, and a single directivity wider than in other cases may mean that the directivity of the beam is wide, that is, the radiation angle (region) of the beam (Radio waves and radio signals) is at least planarly large (wide).

The control unit 270 may transmit a plurality of different synchronization signal blocks (SSB) during the channel occupancy time (COT) after the channel access procedure in the unlicensed frequency band Fu included in the FR 2 x.

As described above, the SSB is composed of SS and PBCH blocks, but the synchronization signal block may be interpreted as equivalent to the discovery burst defined in 3GPP TS 37.213.

The discovery burst may include CORESET and/or PDSCH as well as SS/PBCH as described above.

Further, the channel access procedure according to the present embodiment may be applied to other DL transmissions other than synchronization signal blocks or discovery bursts (hereinafter the same).

The control unit 270 may also perform the channel access procedure described above using omni-directivity instead of broad single directivity.

Omni-directional may mean directivity in which gain is obtained equally in all directions of at least 360 degrees, that is, omni-directional.

Also, the control unit 270 may execute the channel access procedure using a wider directivity or non-directivity than in other cases only when transmitting the SSB in the unlicensed frequency band Fu (second frequency band) included in the FR 2 x. For example, the channel access procedure may be performed using omni-directivity only when transmitting the SSB in the 60 GHz unlicensed frequency band. That is, when a signal other than the SSB is transmitted in the unlicensed frequency band Fu of FR2x, a channel access procedure using directivity may be used.

The control unit 270 may have a longer sensing slot duration in accordance with the channel access procedure than would otherwise be the case with channel access procedures using broader directivity or omni-directivity in the unlicensed frequency band Fu (second frequency band) included in the FR2x, in the FR1 and FR2 (first frequency band) cases, or in other cases in the FR2x.

The sensing slot duration may mean a sensing slot duration (For example, $T_{sl}$) as defined in 3GPP TS 38.213, Chapter 4.1, or may be interpreted as a sensing interval (sensing interval, for example, $T_{short\_dl}$ (for example, Type 2A)).

The control unit 270 may also perform the channel access procedure using a plurality of directivities, which may be referred to as directional receive beams. In this case, the control unit 270 may transmit one or more different SSBs during the channel occupancy time (COT) after the channel access procedure using the plurality of directivities.

The directivity-based channel access procedure may mean that the receive beam BM has directivity and performs sensing using a receive beam that covers a certain direction (region). The control unit 270 can use a plurality of directivity having different directions.

The SSB transmitted in the COT may be an SSB associated with the received beam BM used in the channel access procedure (Directional-LBT) as described above.

The control unit 270 may execute a channel access procedure using a plurality of directivities only in the unlicensed frequency band Fu (second frequency band) included in the FR 2 x. For example, the channel access procedure may be executed using a plurality of directivities only in the 60 GHz unlicensed frequency band, and a plurality of SSBs associated with each of the directivities may be transmitted in the COT.

Further, the control unit 270 may use directivity having different directions for each sensing slot. As noted above, the sensing slot is defined in the channel access procedure and may be interpreted as a basic unit to assess the availability of the channel to carry out the transmission.

Directivity in different directions may be interpreted as beams BM having different transmit/receive (radiation) directions and/or different transmit/receive (radiation) widths, or simply as beams BM having different identifiers. That is, as a result, beams BM having different transmission and reception directions (covering regions) may be used.

In addition, the control unit 270 may transmit only the SSBs associated with the directivity for which the channel access procedure (Directional LBT/CCA) has succeeded in the COT.

That is, as a result of sensing (Directional LBT/CCA) in the sensing slot, a collision or the like is detected, and the SSB associated with the directivity that failed the LBT/CCA need not be transmitted.

In the COT, nothing may be transmitted in the slot (time frame) reserved for the SSB, another SSB that has succeeded in LBT/CCA may be repeatedly transmitted, or another signal having directivity that has succeeded in LBT/CCA may be transmitted.

When transmitting a plurality of SSBs within a COT using directivity, control unit 270 may execute a channel access procedure in which a backoff for collision avoidance is not provided from the viewpoint of complexity avoidance or the like.

Specifically, control unit 270 may not perform the Type 1 channel access procedure but may perform the Type 2A/2B channel access procedure. The channel access procedure using a plurality of directivities may be used only in the channel access procedure of Type 2.

The control unit 270 may also perform the channel access procedure using a single directivity, which may be referred to as a directional receive beam. In this case, the control unit 270 may transmit a single SSB at the channel occupancy time (COT) after the channel access procedure using a single directivity.

The single directivity may be interpreted as any one of a plurality of directivities that the gNB 100 can transmit. The control unit 270 may execute the channel access procedure (Directional LBT/CCA) using the selected one directivity and transmit the SSB associated with the one directivity.

In this case, that is, when the channel access procedure is executed using a single directivity in the unlicensed frequency band Fu (the second frequency band) included in FR2x, the control unit 270 may shorten the sensing slot period according to the channel access procedure as compared with the case of FR1 and FR2 (the first frequency band).

For example, the control unit 270 may apply a sensing slot duration shorter than the transmit gap (25 µs) according to the channel access procedure defined in the 3GPP TS 37.213.

When the channel access procedure is executed using a single directivity in the unlicensed frequency band Fu (the second frequency band) included in the FR 2x as described above, the control unit 270 may execute a channel access procedure in which conditions are looser than those in the FR 1 and FR 2 (the first frequency band).

For example, the channel access procedure of Type 2A specifies that the transmission duration is applicable only when the transmission duration is 1 ms or less and the duty cycle of the discovery burst is $1/20$ or less, but these conditions may be relaxed.

Specifically, a longer transmission duration may be applied, or a larger duty cycle may be applied. The duty cycle of the discovery burst may be interpreted as the ratio of the transmission duration of the discovery burst to the transmission cycle time of the discovery burst.

When the channel access procedure is executed using a single directivity in the unlicensed frequency band Fu (the second frequency band) included in the FR2x, the control unit 270 may apply a mapping pattern of the SSB different from that of the FR1 and FR2 (the first frequency band).

For example, a gap for LBT including at least one symbol may be provided between two adjacent SSBs in the time direction. Alternatively, a gap of a plurality of symbols including a gap for LBT may be provided between two SSBs adjacent in the time direction. However, if the characteristics (such as QCL) of the SSB are similar, such a gap need not be provided.

(2.2) UE 200

In the case of the UE 200, the function description of the gNB 100 described above may be read as the function of the UE 200, that is, to execute UL transmission and DL reception.

In this embodiment, the control unit 270 of the UE 200 can perform radio communication in the unlicensed frequency band Fu. In particular, the control unit 270 can perform radio communication in the unlicensed frequency band Fu (second frequency band) included in the FR 2 x.

The control unit 270 may assume that a plurality of different SSBs are transmitted by the gNB 100 during the channel occupancy time (COT) following a channel access procedure performed by the gNB 100 using a single directivity that is wider than otherwise.

Alternatively, the control unit 270 may assume that in the channel occupancy time (COT) following a channel access procedure performed by the gNB 100 using a plurality of directional receive beams, the gNB 100 transmits a single or a plurality of SSBs corresponding to the directionality with which the channel access procedure was successful.

Alternatively, the control unit 270 may assume that a single SSB is transmitted by the gNB 100 at the channel occupancy time (COT) following a channel access procedure performed by the gNB 100 using a single directional receive beam.

(3) Operation of Radio Communication System

Next, the operation of radio communication system 10 will be described. Specifically, an operation related to a channel access procedure in the case of using an unlicensed frequency band will be described.

(3.1) Assumptions

The 3GPP TS 37.213 specifies a channel access procedure (For example, in the 5/6 GHz band) for the unlicensed frequency band Fu included in the FR 1.

In addition, 3GPP has agreed to support both a channel access procedure for performing LBT and a channel access procedure for not performing LBT in order to expand an unlicensed frequency band Fu included in FR2x in an unlicensed frequency band Fu included in FR2x, such as 60 GHz.

For high frequency bands such as 60 GHz, each region or country has regulations on the use of unlicensed frequency bands. For example, Europe/CEPT (European Conference of Postal and Telecommunications Administration) requires appropriate spectrum sharing mechanisms. In Japan, when a transmission power exceeding 10 dBm is used, a sensing function of a carrier is required.

Based on 3GPP Release 16 and the discussion in 3GPP, it is assumed that a maximum of 64 SSBs, that is, a plurality of beams BM having different directions (directivity) associated with each SSB, are supported in any of FR1, FR2 and FR2x (which may include unlicensed frequency bands).

Further, as described above, in order to realize channel access complying with LBT/CCA in the unlicensed frequency band Fu, Directional LBT/CCA (also referred to as Beam-based LBT/CCA), that is, channel access procedure using directivity may be applied.

In the NR-U of 3GPP Release-16, COT sharing between the gNB 100 and the UE 200 (COT) is also permitted under some restrictions. The restriction is, for example, a transmission period, a type of transmission signal/channel, a priority class, etc.

The duration of the COT (Available LBT sub-band, COT length) can be indicated for a group of UEs 200 using DCI format 2_0.

In addition, NR-U enables channel access procedures (LBT/CCA) by LBE (Load Based Equipment) and FBE (Frame Based Equipment). LBE and FBE differ in the configuration of frames and COTs used for transmission and reception.

In the FBE, the timing of transmission and reception related to the LBT is fixed. In the LBE, the timing of transmission and reception relating to the LBT is not fixed, and the LBT can be flexibly executed in response to a demand or the like. In the case of LBE, a backoff time may be provided to avoid collision.

The LBE performs multiple channel access steps over time, and the Contention Window Size (CWS) can be configured according to the length of the COT. Transmission is not permitted for collision prevention until the backoff time expires (the backoff counter becomes 0). Further, the COT (gNB-initiated COT) after the channel access procedure led by the gNB is executed and the COT (UE-initiated COT) after the channel access procedure led by the UE is executed can be configured.

On the other hand, the FBE also executes a plurality of channel access procedures over time. However, the timing of transmission/reception related to the LBT is fixed in accordance with the Fixed Frame Period (FFP).

When a high frequency band such as FR2x is used, it is assumed that Directional LBT/CCA (Beam-based LBT/CCA) using a plurality of directivity having different directions is applied in order to cope with a wide bandwidth and a large propagation loss. Thus, the channel access success rate can be improved even in a high frequency band such as FR2x.

The LBT and CCA may be interpreted as channel access or sensing, as described in 3GPP TS 37.213.

(3.2) Issues

As described above, it is considered that a maximum of 64 synchronization signal blocks (SSB) can be used in the high frequency band FR2x, that is, 52.6~71 GHz, as in the case of FR2 and the like. In the case of a high frequency band such as FR2x, it is assumed that, in order to ensure a constant coverage, it is necessary to sweep beams with different directions sequentially and transmit SSBs associated with the beams sequentially.

Figure 5:
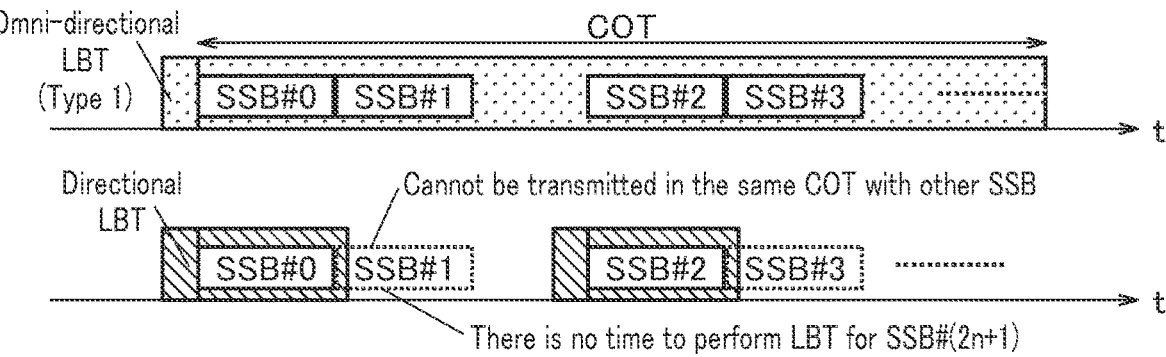
FIG. 5 is a diagram showing an example of the relationship between the channel occupancy time and the synchronization signal block according to the conventional LBT/CCA.

FIG. 5 shows an example of the relationship between the channel occupancy time and the synchronization signal block according to the conventional LBT/CCA. Specifically, the upper part of FIG. 5 shows an example of an SSB allocated within the channel occupancy time (COT) obtained by omni-directional-LBT (equivalent to Type 1, for example), that is, an SSB transmitted within the COT. In the case of Omni-directional LBT, since sensing is performed in all directions, it is possible to transmit a plurality of SSBs (SSB #0, 1, 2, 3) having different associated directions in the COT.

The lower part of FIG. 5 shows an example of SSB allocated within the channel occupancy time (COT) obtained by Directional-LBT (SSB), that is, SSB transmitted within COT. As shown in the lower part of FIG. 5, since a particular Directional-LBT can cover only a particular direction, the corresponding COT will also cover only that particular direction.

Therefore, when transmitting an SSB using the Directional-LBT, a single Directional-LBT does not have time to execute the Directional-LBT for the other direction (SSB) and cannot support transmission of multiple different SSBs within a COT. Therefore, there is also an issue in terms of transmission efficiency.

(3.3) Operation Overview

Hereinafter, an operation example in which the above problem can be solved and the efficient transmission of SSB (discovery burst) can be realized while executing the channel access procedure in the unlicensed frequency band Fu included in FR 2 x such as 60 GHz will be described. Specifically, the following operation examples will be described.

Operation Example 1: SSB Transmission with Omni-Directional-LBT (Only) Applied In this operation example, the channel access procedure (channel access mechanism) for directional transmission other than SSB may be limited to Directional-LBT. That is, the Omni-directional-LBT need not be applied to the directional transmission other than the SSB.

In other words, Omni-directional-LBT may be exceptionally applied to SSB transmission. For SSB transmission, both Directional-LBT and Omni-directional-LBT may be applied, or only Omni-directional-LBT may be applied.

Operation Example 2: SSB Transmission with Multiple Directional-LBTs (Only)

In this operation example, the direction of the LBT (the direction of the received beam) may be different in different sensing slots. That is, the direction of the LBT may be changed to sweep the receive beam BM for each sensing slot.

In this operation example, transmission may be permitted only for the SSB associated with the direction in which the LBT has succeeded (That is, there was no collision). Further, in this operation example, a plurality of Directional-LBTs and Omni-directional-LBTs may be applied to the SSB transmission, or only a plurality of Directional-LBTs may be applied.

Operation Example 3: SSB Transmission with a Single Directional-LBT (Only)

In this operation example, the sensing slot period of the Directional-LBT may be 25 μs or less. In addition, in this operation example, the conditions related to the channel access procedure of Type 2A, for example, the transmission duration (transmission duration, less than or equal to 1 ms) and the duty cycle of the discovery burst ($\frac{1}{20}$ or less) may be relaxed. Further, in this operation example, a single Directional-LBT and Omni-directional-LBT may be applied to the SSB transmission, or only a single Directional-LBT may be applied.

The details of each operation example will be described below.

(3.4) Operation Example 1

Figure 6:
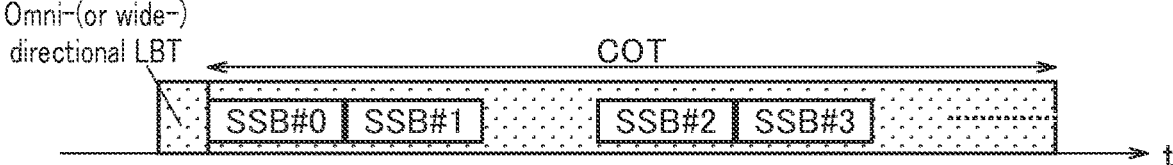
FIG. 6 is a diagram showing an example of the relationship between the channel occupancy time (COT) according to the LBT/CCA according to the operation example 1 and the synchronization signal block.

FIG. 6 shows an example of the relationship between the channel occupancy time (COT) according to the LBT/CCA according to the operation example 1 and the synchronization signal block.

In this operation example, as described above, the SSB transmission applying Omni-directional-LBT (only) may be executed.

Also, instead of omni-directional receive beam BM, an LBT, or channel access procedure, may be performed in place of a single receive beam that is wider than otherwise.

In other words, the Directional-LBT may be performed by beamforming wider than the beam used to transmit the normal SSB.

In such a case, an upper limit of the number of SSBs included in the COT may be specified. For example, a maximum of X SSBs (X=4, 8, 16, etc.) may be specified.

In the example shown in FIG. 6, different SSBs (SSB #0, 1, 2, 3) are transmitted in the COT after the channel access procedure, but the same SSB may be transmitted multiple times.

The channel access procedure (channel access mechanism) for directional transmission other than SSB may be limited to Directional-LBT. That is, the Omni-directional-LBT need not be applied to the directional transmission other than the SSB.

For example, the channel access procedure for SSB transmission in the 60 GHz unlicensed frequency band may be limited to Omni-directional-LBT only.

Alternatively, Omni-directional-LBT or Directional-LBT may be used as the channel access procedure for SSB transmission in the 60 GHz unlicensed frequency band. In this case, the conditions to be applied to the Omni-directional-LBT may be specified. For example, a lower energy detection (ED) threshold may be applied than in the case of Directional-LBTs, and an ED threshold different from other LBTs may be specified for Omni-Directional-LBTs.

The result of the LBT for SSB transmission may not affect the Contention Window Size (CWS) of the Type 1 channel access procedure (Omni-directional-LBT for SSB transmission may not affect CWS even if based on Type 1).

The sensing slot period may be different between the Directional-LBT and Omni-directional-LBT. For example, in Omni-directional-LBT, a longer sensing slot duration may be configured.

(3.5) Operation Example 2

Figure 7:
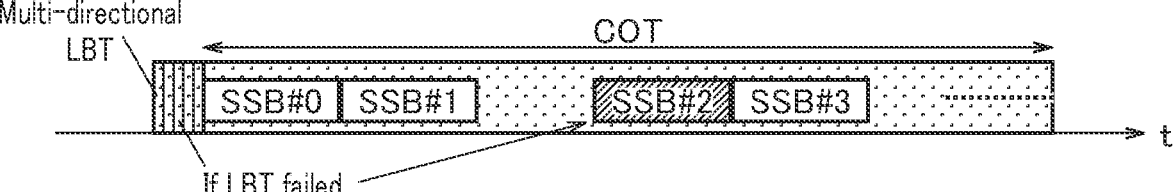
FIG. 7 is a diagram showing an example of the relationship between the channel occupancy time according to the LBT/CCA according to the operation example 2 and the synchronization signal block.

FIG. 7 shows an example of the relationship between the channel occupancy time according to the LBT/CCA according to the operation example 2 and the synchronization signal block.

In this operation example, as described above, the SSB transmission applying a plurality of Directional-LBTs (only) may be executed.

The Directional-LBT may be different to beam sweep in different sensing slots. Transmission of the SSB associated with the successful LBT (direction) may be permitted. That is, as shown in FIG. 7, the SSB (SSB #2) associated with the failed LBT (direction) need not be transmitted.

Such a plurality of Directional-LBTs (multidirectional LBTs) may be applied only to SSB transmissions, or may be applied to other DL transmissions.

Also, the channel access procedure for SSB transmission in the 60 GHz unlicensed frequency band may be limited to only such multidirectional LBTs.

Alternatively, Omni-directional-LBT or multidirectional LBT may be used as a channel access procedure for SSB transmission in the 60 GHz unlicensed frequency band.

Alternatively, the channel access procedure for SSB transmission in the 60 GHz unlicensed frequency band may use a multidirectional LBT or a single Directional-LBT.

The application of multidirectional LBT may be limited to Type 2 channel access procedures (That is, no random backoff). Conditions for applying multidirectional LBT to Type 2 channel access procedures may be specified.

For example, a transmission duration up to X ms, a duty cycle equal to or less than Y, and {X, Y} may be different between {1, 1/20} and an unlicensed frequency band such as 60 GHz.

(3.6) Operation Example 3

Figure 8:
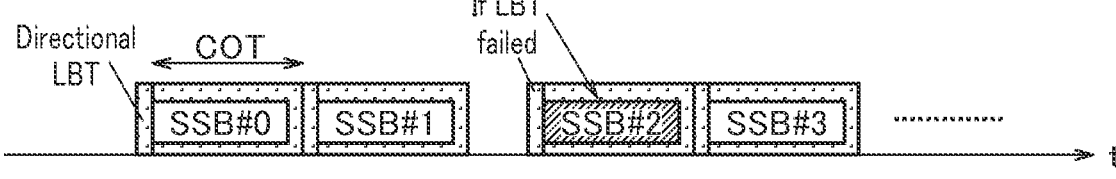
FIG. 8 is a diagram showing an example of the relationship between the channel occupancy time according to the LBT/CCA according to the operation example 3 and the synchronization signal block.

FIG. 8 shows an example of the relationship between the channel occupancy time according to the LBT/CCA according to the operation example 3 and the synchronization signal block.

In this operation example, as described above, SSB transmission applying a single Directional-LBT (only) may be performed. As shown in FIG. 8, the SSB (SSB #2) associated with the failed LBT (direction) need not be transmitted (the same as in the operation example 2). As shown in FIG. 8, in the COT after the channel access procedure using a single Directional-LBT, only one SSB associated with the LBT (direction) may be transmitted.

The sensing slot duration of the Directional-LBT may be 25 μs or less (similar to Type 2A). The maximum channel occupancy time (COT) may be less than or equal to 1 ms.

Also, the conditions relating to the channel access procedure of Type 2A, for example, the transmission duration (1 ms or less) and the duty cycle of the discovery burst (1/20 or less) may be relaxed. For example, the duty cycle may be 1/20 or more.

The mapping pattern of the SSB may be different from FR1 and FR2. For example, a gap for LBT including at least one symbol may be provided between two adjacent SSBs in the time direction.

(4) Operational Effects

According to the embodiment described above, the following effects are obtained. Specifically, in operation example 1, a channel access procedure is executed using a single receive beam wider than in other cases or an omni-directional receive beam, and a plurality of different SSBs (discovery bursts) are transmitted in the COT after the channel access procedure.

Therefore, many SSBs can be transmitted in one channel access procedure. Thus, efficient SSB transmission can be realized even when an unlicensed frequency band of a high frequency band such as a 60 GHz band is used.

In operation example 2, a channel access procedure is executed using a plurality of directional receive beams, and a plurality of different SSBs are transmitted in the COT after the channel access procedure.

Therefore, a plurality of SSBs can be transmitted within the same COT while executing a plurality of LBTs (sensing) targeting a specific direction. Thus, efficient SSB transmission can be realized even when an unlicensed frequency band of a high frequency band such as a 60 GHz band is used.

In operation example 3, a channel access procedure is executed using a single directional receive beam, and a single SSB is transmitted in the COT after the channel access procedure.

Therefore, the SSB corresponding to the LBT (direction) can be surely transmitted in the COT while executing a single LBT (sensing) for a specific direction. Thus, efficient SSB transmission can be realized even when an unlicensed frequency band of a high frequency band such as a 60 GHz band is used.

The Omni-directional-LBT according to the operation example 1 and the plurality of Directional-LBTs according to the operation example 2 can be applied only to an unlicensed frequency band of a high frequency band such as a 60 GHz band. In operation example 1, Omni-directional-LBT can be applied only when SSB is transmitted in the unlicensed frequency band. This can contribute to the improvement of the success rate of the LBT in the case of using the unlicensed frequency band of the high frequency band and the efficient SSB transmission.

In operation example 1, in the case of an unlicensed frequency band of a high frequency band, the sensing slot period may be extended. This makes it easy to secure sufficient time for omnidirectional sensing.

In operation example 2, a directivity (receiving beam) having a different direction may be used for each sensing slot. Thus, LBT (sensing) targeting more directions can be efficiently executed.

In operation example 2, only the SSB associated with the directivity (receiving beam) of which the channel access procedure was successful can be transmitted. Therefore, the reception probability of the SSB can be improved. In operation example 2, a channel access procedure in which no backoff for collision avoidance is provided can also be executed. Therefore, the multidirectional LBT can be realized while avoiding complexity.

In the operation example 3, in the case of the unlicensed frequency band of the high frequency band, the sensing slot period can be shortened. This enables rapid sensing in response to a single Directional-LBT. Further, in the operation example 3, the channel access procedure whose conditions are more relaxed than those of the FR1 and FR2 can be executed, and the mapping pattern of the SSB different from those of the FR1 and FR2 can be applied. Therefore, efficient SSB transmission using a single Directional-LBT can be realized.

(5) Other Embodiments

Although the embodiment has been described above, it is obvious to those skilled in the art that various modifications and improvements are possible without being limited to the description of the embodiment.

For example, although SSB (discovery burst) transmission has been described in the above embodiment, it may be applied to transmission other than SSB. Specifically, the channel access procedure according to the above-described operation example may be applied to another DL transmission (DL burst).

In this case, the channel access procedure for SSB and the channel access procedure for other DL transmissions may be the same or different.

The unlicensed frequency bands may also be referred to by different names. For example, the terms License-exempt or Licensed-Assisted Access (LAA) may be used.

A block diagram (FIG. 4) used in the description of the above-described embodiment shows a block for each function unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 9:
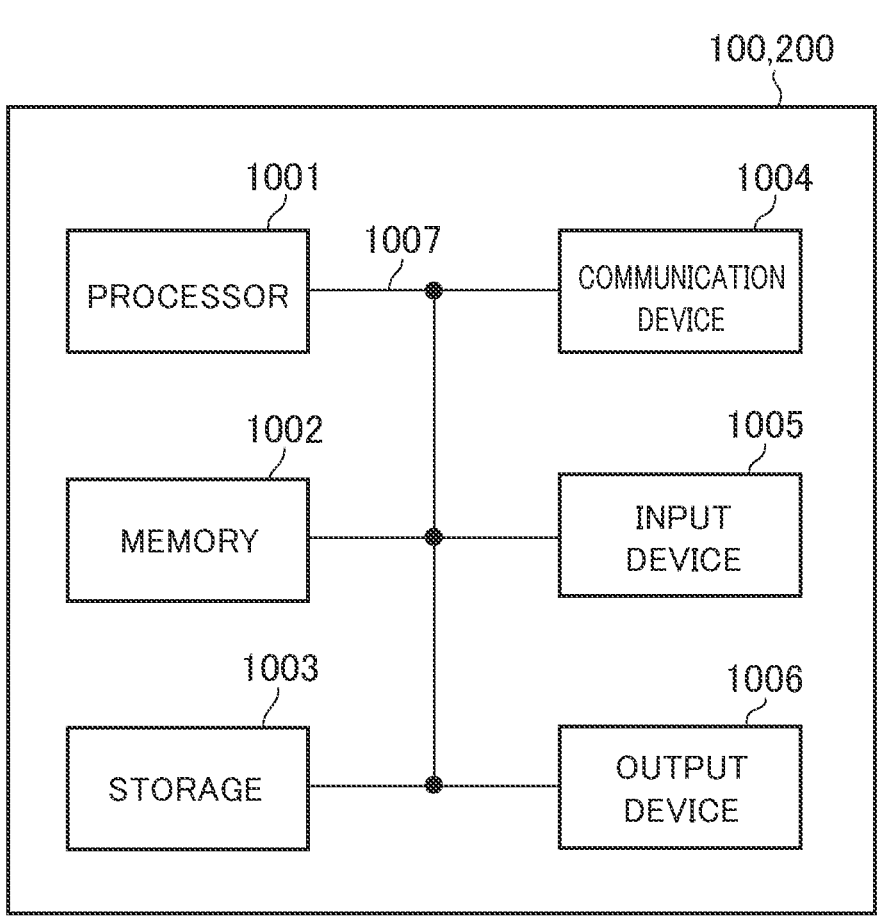
FIG. 9 is a diagram showing an example of a hardware configuration of the gNB 100 and the UE 200.

Further, the above-mentioned gNB 100 and UE 200 (the apparatus) may function as a computer that performs processing of the radio communication method of the present disclosure. FIG. 9 is a diagram showing an example of a hardware configuration of the apparatus. As shown in FIG. 9, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

Each functional block of the device (see FIG. 4) is implemented by any hardware element or combination of hardware elements of the computer device.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

In addition, the device may comprise hardware such as a microprocessor, a digital signal processor (DSP), an application specific integrated circuit (ASIC), a programmable logic device (PLD), a field programmable gate array (FPGA), and the hardware may implement some or all of each functional block. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, and the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, the mobile station in the present disclosure may be read as a base station. In this case, the base station may have the function of the mobile station. A radio frame may be composed of one or more frames in the time domain. Each frame or frames in the time domain may be referred to as a subframe. A subframe may be further configured by one or more slots in the time domain. The subframe may be a fixed time length (For example, 1 ms) independent of the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or "decision" may include regarding some action as "judgment" or "decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 radio communication system
20 NG-RAN
100 gNB
200 UE
210 radio signal transmission and reception unit
220 amplifier unit
230 modulation and demodulation unit
240 control signal and reference signal processing unit
250 encoding/decoding unit
260 data transmission and reception unit
270 control unit
1001 processor
1002 memory
1003 storage
1004 communication device
1005 input device
1006 output device
1007 bus

The invention claimed is:

1. A radio base station comprising:
a processor that executes a channel access procedure using a single sensing beam covering multiple transmission beams in a second frequency band different from a first frequency band; and
a transmitter that transmits a primary synchronization signal, a secondary synchronization signal or a downlink physical broadcast channel using the multiple transmission beams in a channel occupancy time after the channel access procedure,
wherein a sensing slot period of the channel access procedure in the second frequency band is shorter than a transmission gap after the channel access procedure, and wherein a radiation region of the single sensing beam is wider than a radiation region covered by the multiple transmission beams.

2. A radio communication method of a radio base station, comprising:
executing a channel access procedure using a single sensing beam covering multiple transmission beams in a second frequency band different from a first frequency band; and
transmitting a primary synchronization signal, a secondary synchronization signal or a downlink physical broadcast channel using the multiple transmission beams in a channel occupancy time after the channel access procedure, and
wherein a sensing slot period of the channel access procedure in the second frequency band is shorter than a transmission gap after the channel access procedure, and wherein a radiation region of the single sensing beam is wider than a radiation region covered by the multiple transmission beams.

3. A radio communication system including a radio base station and a terminal, wherein the radio base station comprises:
a processor that executes a channel access procedure using a single sensing beam covering multiple transmission beams in a second frequency band different from a first frequency band; and a transmitter that transmits a primary synchronization signal, a secondary synchronization signal or a downlink physical broadcast channel using the multiple transmission beams in a channel occupancy time after the channel access procedure, wherein a sensing slot period of the channel access procedure in the second frequency band is shorter than a transmission gap after the channel access procedure, and the terminal comprises a receiver that receives the primary synchronization signal, the secondary synchronization signal or the downlink physical broadcast channel, and wherein a radiation region of the single sensing beam is wider than a radiation region covered by the multiple transmission beams.

\* \* \* \* \*